No. 881,513. PATENTED MAR. 10, 1908.
J. WENGS.
CEMENT BLOCK MACHINE.
APPLICATION FILED SEPT. 23, 1907.
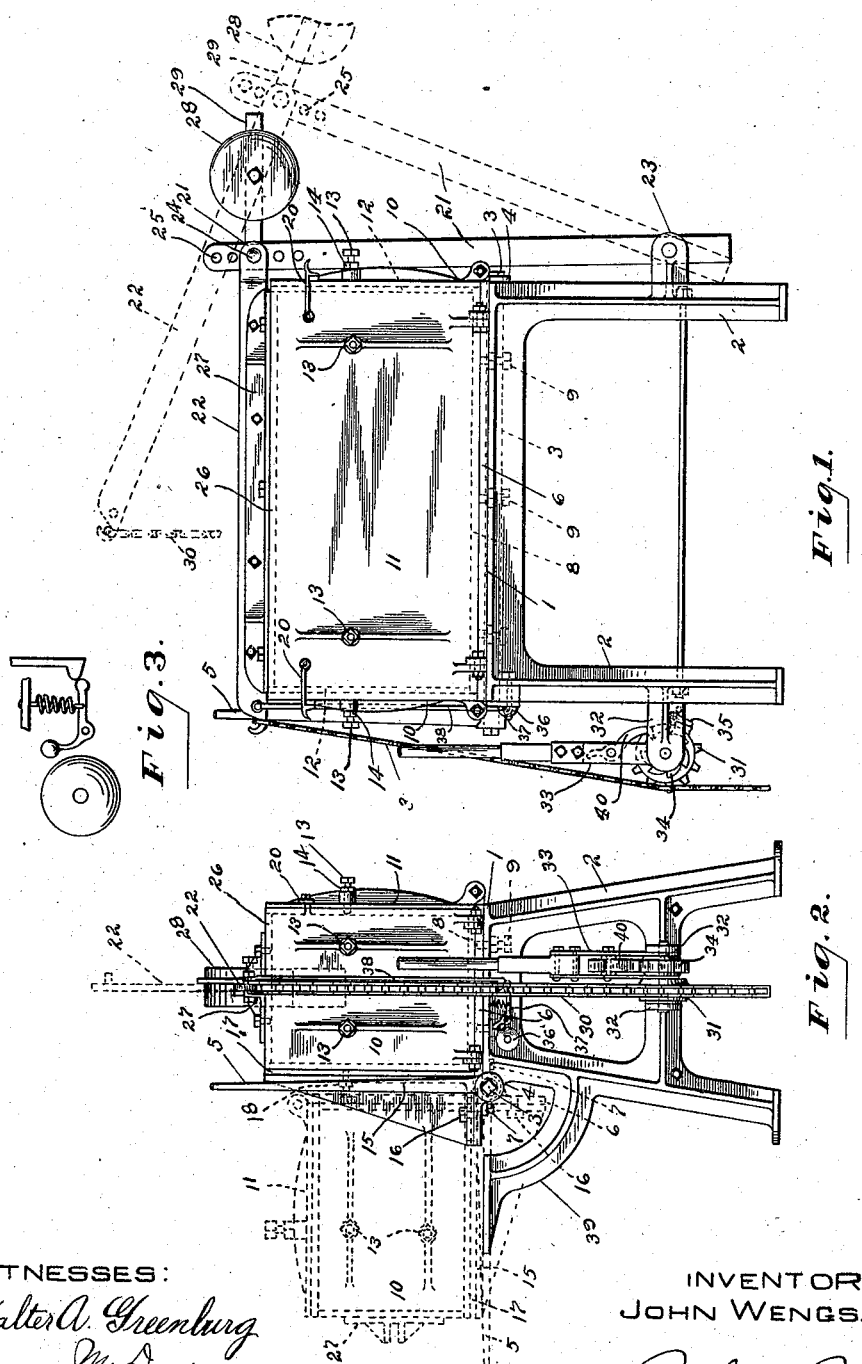
WITNESSES:
Walter A. Greenburg
Anna M. Dorr
INVENTOR:
JOHN WENGS.
BY 
ATTORNEYS.

UNITED STATES PATENT OFFICE.

JOHN WENGS, OF MONROE, MICHIGAN.

CEMENT-BLOCK MACHINE.

No. 881,513.  Specification of Letters Patent.  Patented March 10, 1908.

Application filed September 23, 1907. Serial No. 394,101.

*To all whom it may concern:*

Be it known that I, JOHN WENGS, a citizen of the United States of America, residing at Monroe, in the county of Monroe and State of Michigan, have invented certain new and useful Improvements in Cement-Block Machines, of which the following is a specification, reference being had therein to the accompanying drawings.

This invention relates to improvements in molds for bodies of cementitious material whereby blocks of uniform density are obtained without the use of skilled labor.

The invention consists of the matters hereinafter set forth, and more particularly pointed out in the appended claims.

Referring to the drawings, Figure 1 is a view in front elevation of a mold embodying features of the invention showing the mold filled and closed. Fig. 2 is a view in end elevation of the mold turned on its side and opened. Fig. 3 is a view in detail of a stop signal.

In the drawings, 1 is the horizontal top and 2 the end supports or legs of the bench of convenient height, having a horizontal shaft 3 journaled in lateral brackets 4, and operated by a hand lever 5. A bed plate 6 is secured to the shaft by bolts 7 or like suitable members so that it may be swung into an upright or vertical position by the hand lever. A movable bottom plate or board 8 is held in place by studs 9 passing through the bed plate which afford adjustment of the board for making different sizes of blocks. Ears on the ends and rear edge of the bed plate with similar ears on end plates 10 and a rear side wall 11 hinge the latter to the bed plate. End facing plates or boards 12 are adjustably secured within the end plates by properly disposed bolts or screws 13 provided with check-nuts 14. The front of the mold is formed by brackets 15 adjustably held to the bed plate by bolts 16 or the like passing through slots in the plate, and a removable board 17 within the brackets held to place by bolts or studs 18 passing through apertures in the brackets abutting against the board and locked in place by check-nuts. The side and end plates are locked by suitably arranged hooks or clamps 20.

A link 21 articulates one end of the presser bar 22 to lugs 23 on one of the bench supports 2, a pivot pin 24 or bolt engaging any one of the series of apertures 25 on the link and affording adjustment for different thicknesses of blocks. The presser bar extends the length of the mold, and a cover board 26 is removably secured by screws or the like to oppositely disposed angle irons 27 or flanges on the lower edge of the bar. A counterbalance weight 28 is adjustably secured on an extension 29 of the bar. A sprocket chain 30 on the free end of the presser bar may be dropped over a sprocket wheel 31 which is journaled between horizontal lugs or arms 32 on the end support 2 of the bench. A forked ratchet lever 33 with properly disposed dog 40 operates a ratchet wheel 34 keyed or otherwise secured to the sprocket wheel 31, a pawl 35 locking the wheel as desired. An alarm signal is secured to the bench at its lower end, preferably in the shape of a bell 36 having a spring returned hammer 37 or like sounding means which is pushed back by a gage stop 38 adjustably secured to the presser bar, and snaps by the stop when the bar is drawn home. A suitable support 39 is provided to hold the moldbox when turned on its side.

In operation, the bed plate is horizontally disposed with the bottom board and inner end and side walls adjusted to give the size of block desired, and with a top or cover board corresponding in size to the block, secured to the presser bar which is tilted back by its counter-balance. The mold is filled, the presser bar swung down and its chain thrown over the sprocket wheel. The ratchet lever is then used to draw the cover down with a steady continuous pressure until the signal announces the predetermined pressure has been applied. The release of the ratchet allows the counterbalance to tilt the cover back, the mold is tipped over on its side by the shaft handle bar, the sides and ends swung clear of the block and the latter carried away on the board which forms the front wall.

The chief advantage is the fact that blocks of uniform density may be obtained, while the working parts are readily adjusted and replaced if worn. Unskilled labor may be used as the signal insures uniformity in product without special experience on the part of the operator.

What I claim as my invention is:—

1. The combination of a supporting bench and a cement block mold hinged to the bench having adjustably secured end, side and bottom walls, with means for forcing a cover into the mold to a predetermined distance above the bottom board consisting of an upright link pivoted to one end of the bench, a presser bar adjustably pivoted at one end to the upper part of the link to swing in a vertical plane above the mold when the latter is upright, a cover on the bar, a sprocket wheel journaled on the bench in the plane of oscillation of the lever, a sprocket chain on the bar adapted to drop over and engage the sprocket wheel when the bar is turned down over the mold, and a ratchet lever for operating the sprocket wheel.

2. The combination of a supporting bench and a cement block mold hinged to the bench having adjustably secured end, side and bottom walls, with means for forcing a cover into the mold to a predetermined distance above the bottom board consisting of an upright link pivoted to one end of the bench, a presser bar adjustably pivoted at one end to the upper part of the link to swing in a vertical plane above the mold when the latter is upright, a cover on the bar, a sprocket wheel journaled on the bench opposite the link in the plane of oscillation of the lever, a sprocket chain on the bar, adapted to drop over and engage the sprocket wheel when the bar is turned down over the mold, a counterbalance weight secured on an extension of the bar beyond the link adapted to swing the lever clear of the mold when the chain is disengaged from the sprocket and a ratchet lever for operating the sprocket wheel.

3. The combination of a supporting bench and a cement block mold hinged to the bench having adjustably secured end, side and bottom walls, with means for forcing a cover into the mold to a predetermined distance above the bottom consisting of an upright link pivoted to one end of the bench, a presser bar adjustably pivoted at one end to the upper part of the link to swing in a vertical plane above the mold when the latter is upright, a cover on the bar, a sprocket wheel journaled on the bench opposite the link in the plane of oscillation of the lever, a sprocket chain on the bar adapted to drop over and engage the sprocket wheel when the bar is turned down over the mold, an alarm signal on the bench adapted to be sounded by the bar when the latter has reached a predetermined position, and a ratchet lever for operating the sprocket wheel.

In testimony whereof I affix my signature in presence of two witnesses.

JOHN WENGS

Witnesses:
C. R. STICKNEY,
OTTO F. BARTHEL.